United States Patent [19]
Miller

[11] 3,791,726
[45] Feb. 12, 1974

[54] LOW INTERTIA FILM DRIVE AND CASSETTE

[75] Inventor: John W. Miller, Smyrna, Ga.

[73] Assignee: Lockheed Aircraft Corporation, Los Angeles, Calif.

[22] Filed: Sept. 17, 1971

[21] Appl. No.: 181,295

[52] U.S. Cl.............. 352/166, 352/78 R, 352/224, 226/118, 242/55.16
[51] Int. Cl...................... G03b 1/48, G03b 23/04
[58] Field of Search ...... 242/55.16, 55.17; 352/221, 352/224, 225, 227, 229, 234, 126, 166; 226/118, 119

[56] References Cited
UNITED STATES PATENTS

| | | | |
|---|---|---|---|
| 1,883,987 | 10/1932 | Lasowsky........................ | 352/126 X |
| 2,068,258 | 1/1937 | Berggren........................... | 352/227 |
| 2,427,327 | 9/1947 | Nemeth............................. | 352/224 |
| 3,244,470 | 4/1966 | Hennessey et al........ | 242/55.19 A X |
| 3,466,123 | 9/1969 | Skuja............................... | 352/221 X |
| 2,042,599 | 6/1936 | Heinis........................... | 242/55.21 X |
| 2,995,313 | 8/1961 | Namenyi-Katz................. | 242/55.16 |
| 3,517,893 | 6/1970 | Schulz.............................. | 242/55.16 |

FOREIGN PATENTS OR APPLICATIONS

| | | | |
|---|---|---|---|
| 131,708 | 8/1932 | Austria............................. | 352/224 |
| 917,136 | 7/1961 | Great Britain.................... | 352/221 |

*Primary Examiner*—George F. Mautz
*Assistant Examiner*—John M. Jillions
*Attorney, Agent, or Firm*—Billy G. Corber; Albert L. Carter

[57] ABSTRACT

Storage and transport apparatus for a web such as photographic film and the like. The film, which is stored in randomly formed loops within the cassette, is withdrawn from the cassette, passed along a film gate including a projection gate by a drive wheel and pinch rollers which contact the film along its edges, and then is returned to the cassette. The design of the film channel, along with the absence of conventional film storage reels, provides a film transport system having low inertia and resulting in rapid frame access time coupled with precision frame positioning.

9 Claims, 9 Drawing Figures

JOHN W. MILLER
INVENTOR.

JOHN W. MILLER
INVENTOR.

BY George Sullivan
Agent

JOHN W. MILLER
INVENTOR.

BY George C. Sullivan
Agent

JOHN W. MILLER
*INVENTOR.*

BY George C. Sullivan
Agent

LOW INERTIA FILM DRIVE AND CASSETTE

This invention relates in general to a web storage and drive apparatus and in particular to apparatus for storing an information-containing web such as photographic film and for rapidly manipulating the web for randomly accessing information contained thereon.

Contemporary data storage and retrieval requirements frequently demand the ability to store large amounts of data and to access desired information from the stored data rapidly, i.e., in a few seconds, and in operator-readable form. The use of manual data storage techniques, such as books, directories, and the like, is becoming increasingly expensive and unwieldy in situations where a high volume of requests is made for information which must be extracted from a large mass of data. Examples which come readily to mind are requests for information about airline flight schedules and the work of the telephone directory assistance, or "Information," operators.

Where the retrieved data will be displayed in textual form for reading by an operator, the data may be stored either photographically on microfilm or the like, or the data may be converted to another form and recorded on a different medium, such as magnetic tape, discs, or the like. Magnetically recorded data typically is retrieved through a CRT readout device operating in conjunction with a computer to select the desired recorded information and convert this information into a readable CRT display. The hardware required to accomplish this form of data acquisition can become expensive, especially where a great number of separate CRT readout terminals must be correlated with a large central file of magnetically recorded data. Moreover, limitations of the resolution of the CRT display prevents an entire textual page of small-print data, such as a telephone directory page, from being presented in a single CRT "frame."

While data retrieval systems using microfilm storage can generally reproduce an entire textual page for viewing, the average frame access time of prior art microfilm readout apparatus generally has been unsatisfactory in applications where a large number of repetitive requests for information must be answered. Prior art microfilm readout apparatus employs a reel-to-reel microfilm arrangement whereby a command to access a particular film frame requires the rotational inertia of two film reels, along with the film contained thereon, to be rapidly overcome to move the film at a high velocity until the desired frame is approached. The rapidly spinning film reels must then be braked to substantially dissipate their momentum before the desired frame actually arrives at the film gate, or else this frame will overshoot the gate and the film transport mechanism will have to reverse itself one or more times until the desired frame is accurately positioned in the gate. This requirement to overcome inertia and then to dissipate momentum not only wastes time, but also requires a complex arrangement of drive motors, clutches and/or brakes, and control circuitry to insure that both film reels are accurately controlled to prevent either spillage or breakage of the film resulting from improper braking or acceleration of the reels.

Microfilm readout devices having a film cassette have also been proposed for the ease of replacing the film. These devices, however, typically retain the reel-to-reel arrangement and do not eliminate the problems of reel inertia and the reel drive shafts and associated mechanisms. While single reel film cassettes are known which contain a continuous strip of film on a single reel, such cassettes are incapable of bi-directional film movement and are thus particularly ineffective for data storage and access applications wherein the film must be moved in either direction to permit the shortest access time for a particular frame of film.

Accordingly, it is an object of this invention to provide an improved film drive apparatus.

It is another object of the present invention to provide film drive apparatus capable of bi-directional high-speed film access movement.

Still another object of the present invention is to provide film drive apparatus for providing high speed, low inertia film movement with a simplicity of mechanism.

Still another object of the present invention is to provide film drive apparatus including a no-reel film storage cassette.

It is yet another object of the present invention to provide a film drive apparatus including a film storage cassette from which the film can be readily removed or replaced without removing the cassette from the apparatus.

Other objects and many of the attendant advantages of the present invention will be readily apparent from consideration of the following description of a preferred embodiment of the invention as illustrated in the annexed drawings in which.

Figure 1:
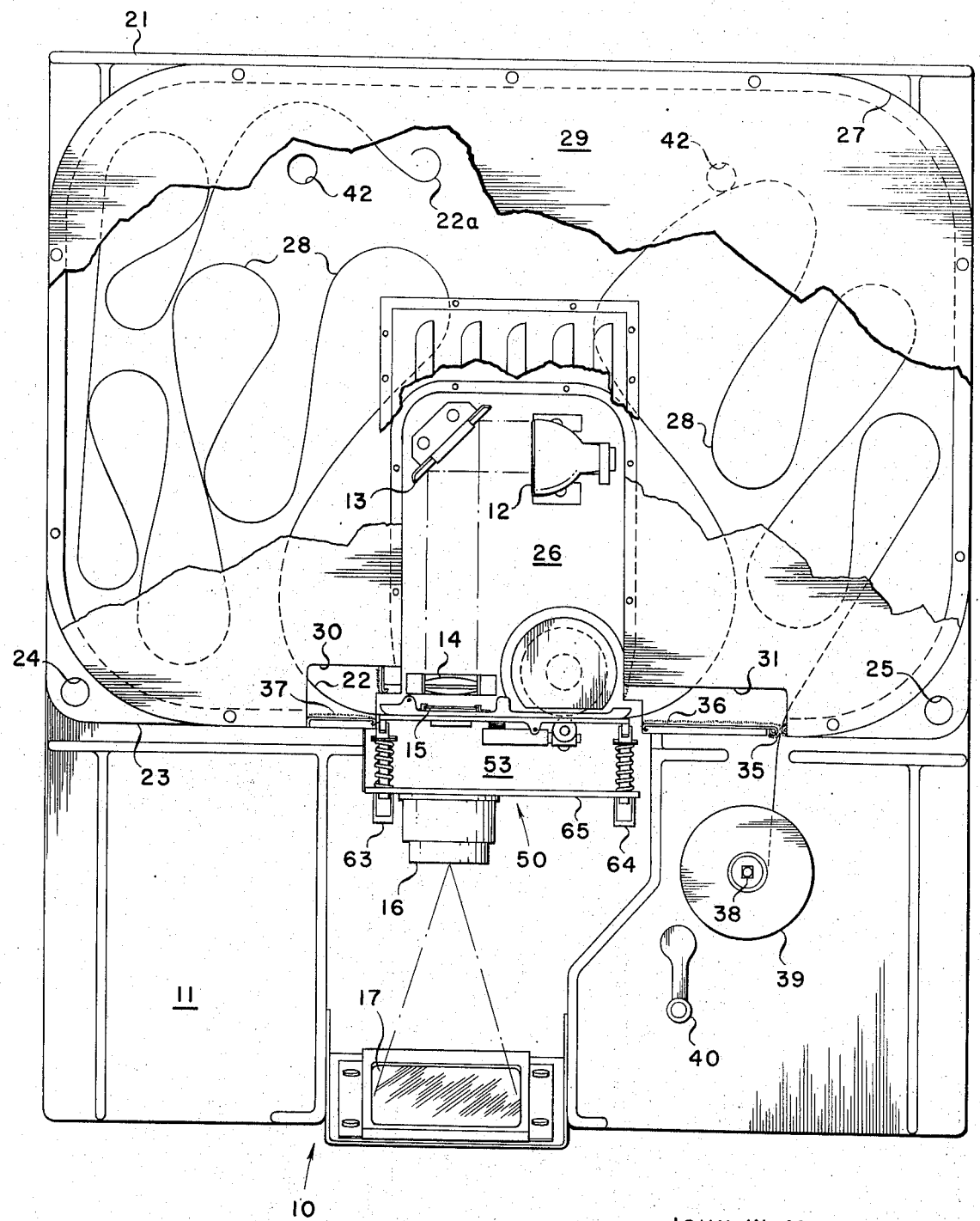
FIG. 1 shows an overall plan view of an embodiment of the present invention.

Stated generally, the present invention comprehends film drive apparatus wherein the film is stored in randomly positioned loops contained within a cassette and is withdrawn from one portion of the cassette, passed through a film gate including an optical portion and then is inserted into another portion of the cassette. The actual film transport is accomplished with a pair of drive wheels which engage the edges of the film against a pair of idler wheels. The film gate provides support and guidance for the film so that the drive wheel can either push or pull the film through the gate to accomplish high-speed film movement in either direction to facilitate rapid random access of a particular film frame.

More specifically and with reference taken to the drawings, there is shown generally at 10 an embodiment of the present invention including a frame 11 containing optical projection apparatus including a projection lamp 12 and a first mirror 13 for directing light from the lamp 12 onto a condensing lens 14. Light passes from the lens 14 through a projection gate 15, to be explained in greater detail below, and a projection lens 16 which directs the light toward a second mirror 17. The images contained on a film frame positioned at the projection gate 15 thus are projected to the mirror 17, which is part of a conventional folded optical system and which reflects the images to a second mirror (not shown) and thence onto a projection screen (not shown). The particular arrangement of the projection lamp 12 and the mirror 13 are not critical to the present invention, since the skilled practitioner could position these elements in different locations to accomplish the end result of illumination passing through the projection gate 15.

A film cassette 21 is removably supported on the frame 11 to contain the film 22 which passes through the projection gate. The cassette 21 includes a member 23 forming the bottom of the cassette and having one or more openings 24 and 25 for engaging locating members which accurately position the cassette within the film drive apparatus. The cassette 21, which is formed generally in the shape of a U having an interrupted area shown at 26 to accommodate the projection and film drive mechanisms, includes a raised side portion 27 extending around the periphery of the cassette. The height of the side portion 27 is somewhat greater than the film which is stored on edge within the cassette to form loops 28 which must be free to slide within the cassette on the edges of the film. A top member 29, shown partially broken away, is removably secured to the side portion 27 to prevent dust or other foreign matter from entering the cassette. The top portion 29 has portions removed to the left and to the right of the open area 26 to form the recesses 30 and 31, respectively, which permit access to the film entering either end of the film gate; the side portion 27 has openings coinciding with the recesses 30 and 31 through which the film 22 enters and leaves the cassette during film traverse.

A slot 35 is formed in that part of the side portion 27 which is exposed by the recess 31, and the sides of this slot are rounded or otherwise made smooth to permit scratch-free passage of the film therethrough. Movement of the film within the cassette may be additionally protected by covering the rounded sides of the slot 35, as well as the side portion regions 36 and 37 which are adjacent the entries of the film gate, with a suitable soft or non-scratching material 41 such as flocking, velvet or the like which protects the film surface from contacting a rough or scratchy surface of the cassette and additionally brushes foreign matter from the film. One or more openings 42 are provided in the bottom of the cassette to permit dirt and other foreign matter to drop through the bottom of the cassette. The openings may be formed in downwardly depressed dimples to avoid contact with the film.

Mounted on the frame 11 adjacent the cassette slot 35 is a film reel spindle 38 onto which a film reel 39 can be removably positioned. The spindle 38 is mechanically interconnected with a crank 40 by means of any suitable linkage such as a gear train or the like, so that the spindle and film reel 39 positioned thereon can be rotated by the crank 40 to rewind the film from the cassette 21 onto the reel 39.

The film 22 contained in the cassette 21 passes through a film gate assembly indicated generally at 50 and containing the projection gate 15. The film gate assembly 50 as particularly shown in FIGS. 2, 3, and 4 includes a forward film gate 51 and an aft film gate 52. The aft film gate 52 in the depicted embodiment is secured to a mounting plate 53, which is in turn attached to the frame 11 of the apparatus. Since the forward and aft film gates should be movable, one with respect to the other, for maintenance and other purposes, the forward film gate 51 has a bevelled lower edge 54 with a pair of abutment members 55, 56 extending downwardly to engage corresponding recesses, one of which is shown at 49 in FIG. 4. The outer surface of the forward film gate 51 is pivotally connected at 57 and 58 to the yoke ends of corresponding rods 59 and 60 which are biased by compression springs 61 and 62 to press the forward film gate into engagement with the aft film gate 52. The ends of the rods 59 and 60 extend through holes in the upright plate 65, and corresponding camming levers 63 and 64 are associated with each of the rods so that the rods can be withdrawn against the force of the compression springs to open the film gate mechanism by a rotating movement along the lower edge 54 which moves the forward film gate 51 away from the aft film gate 52. The forward edge of each of the recesses is undercut as at 49 to accommodate the abutment members 55, 56 when the forward film gate is opened.

Figure 8:
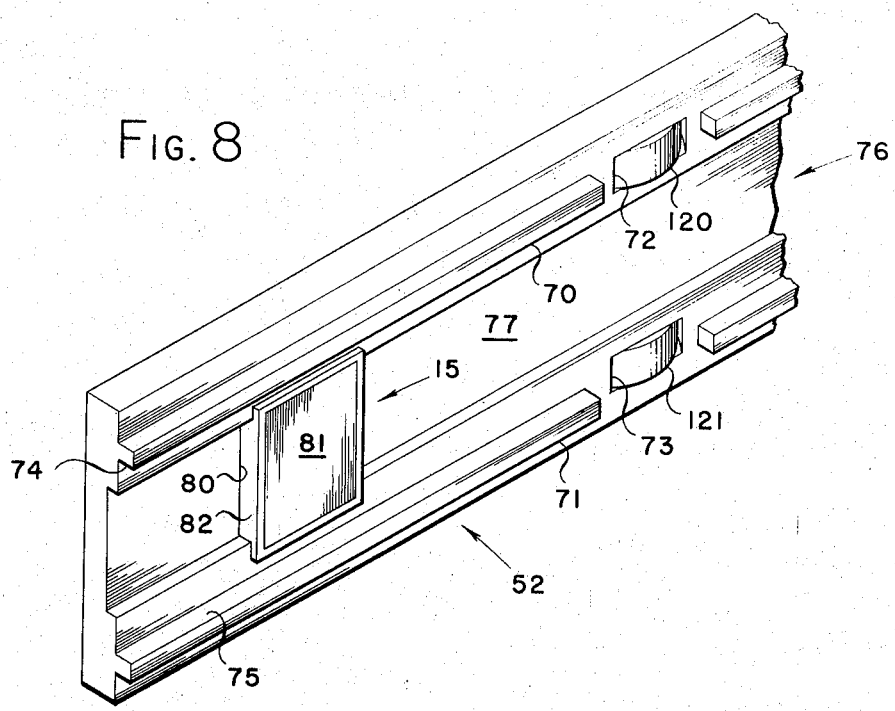
FIG. 8 shows an isometric view of the aft film gate.

The aft film gate 52, as particularly shown in FIG. 8, includes a pair of elongate rib members 70 and 71 which extend along substantially the entire length of the aft film gate and which define a channel for guiding the passage of film through the gate. The rib members 70 and 71, which are interrupted by apertures 72 and 73, respectively, have parallel inwardly facing surfaces 74 and 75 which define the film channel 76 as having a width somewhat greater than the film which passes through the film channel. A relief channel 77 running the entire length of the aft film gate 52 is formed in the film channel 76. Since the relief channel 77 reduces or eliminates contact between the film channel walls and the film passing through the film channel, the width of the relief channel preferably should be at least as great as the width of the photographic information-bearing portion of the film. A relief channel depth of one thirty-second of an inch has been found to be satisfactory with a film channel dimensioned to receive 35 mm film. It will be understood, of course, that other film widths, such as 16mm or 105 mm, can be used as well with an appropriately dimensioned film gate assembly and cassette according to the present invention.

The projection gate 15 is formed in the aft film gate 52 by a projection aperture 80 which extends through the aft film gate. As shown in FIG. 8, the width of the aperture 80 is greater than the width of the relief channel 77. A pressure plate 81 in a frame 82 of somewhat smaller overall dimensions than the aperture 80 extends through that aperture.

Figure 6:
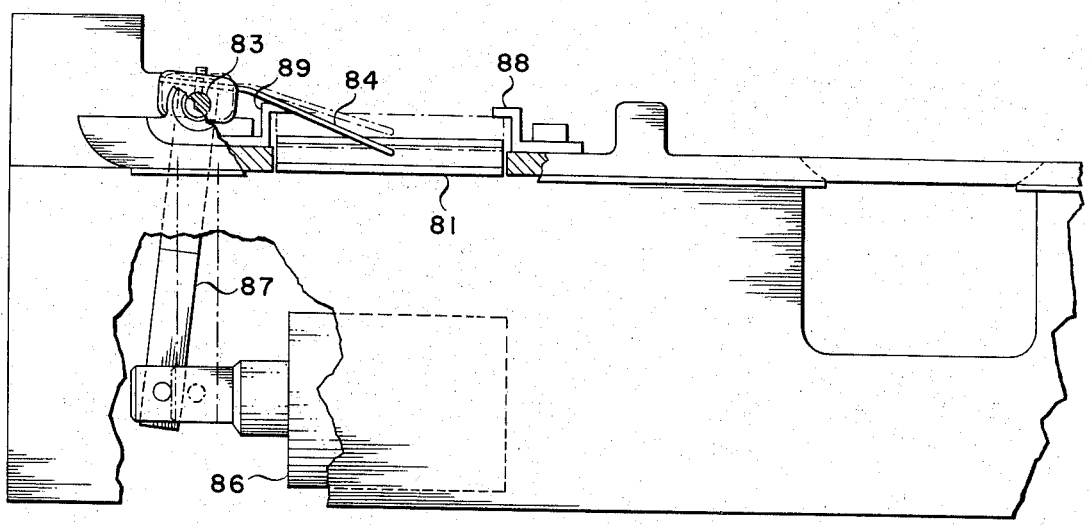
FIG. 6 shows a plan view of the aft film gate of the present embodiment emphasizing the mechanism for moving the film pressure plate.
Figure 7:
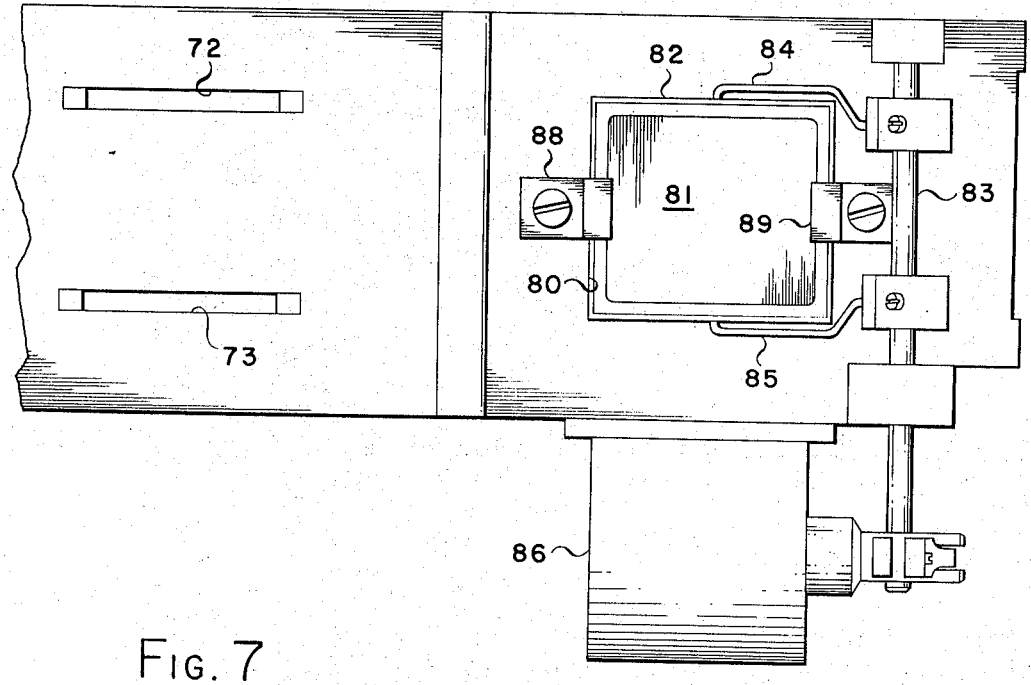
FIG. 7 shows an elevation view of the back portion of the aft film gate and pressure plate actuating assembly of FIG. 6.

Since the pressure plate 81 should press against the film in the film channel only when the film is stationary, apparatus is provided as shown in FIGS. 6 and 7 which moves the pressure plate between an extended or film-contact position, as shown in FIG. 8, to a retracted position wherein the surface of the pressure plate is more or less coplanar with the surface of the relief channel 77. The pressure plate 81 is contained in a surrounding frame 82 which is connected to a rotatable shaft 83 by means of spring rods 84 and 85 pivotally attached to the frame 82. The rod 83 is rotated through limited motion by a solenoid 86 and an arm 87. When the solenoid 86 is disengaged, the arm 87 and the pressure plate 81 assume the position shown by solid lines in FIG. 6 so that the resilient action of the rods 84 and 85 along with the pivotal movement permitted between the spring rods and the frame 82, firmly presses the pressure plate with a two-way leveling action against the film contained in the projection gate. Actuation of the solenoid 86, however, causes the arm 87 and the pressure plate 81 to assume the positions shown by broken lines in FIG. 6 so that the pressure plate is withdrawn from film contact. Suitable stop members 88 and 89 are provided to limit the backward travel of the pressure plate 81.

Figure 9:
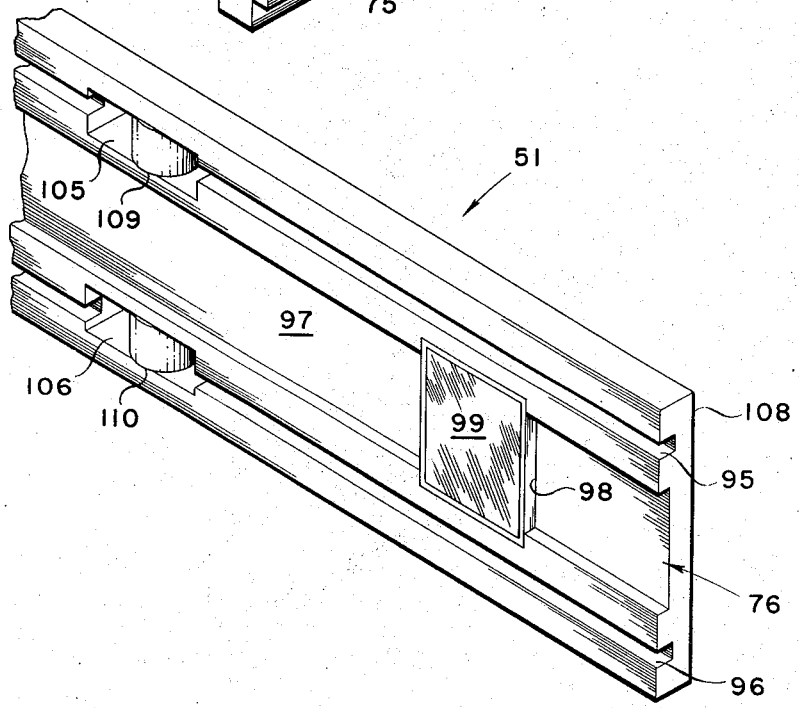
FIG. 9 shows an isometric view of the forward film gate.

The forward film gate 51, shown in detail in FIG. 9, contains two parallel slots 95 and 96 extending the length of the forward film gate. The spacing between the slots 95 and 96 is chosen to permit the rib members 70 and 71 on the aft film gate 52 to fit within the respective slots when the forward film gate is moved to engage the aft film gate as described above, this arrangement being depicted in FIG. 5. The width of the film channel 76 thus is defined as aforesaid by the spacing between the rib members 70 and 71. A relief channel 97 is formed in the forward film gate 51 to be substantially coextensive with the relief channel 77 of the aft film gate 52 when the two film gates are positioned together. A projection aperture 98 of somewhat greater width than the relief channel 97 extends through the forward film gate 51 to comprise a portion of the projection gate 15. A projection gate glass assembly 99 is retained within the aperture 98, and the projection aperture and the gate glass are positioned on the forward film gate 51 so that the two projection apertures 80 and 98 are coextensive with each other and so that the pressure plate 81 can press film in the projection gate against the gate glass 99 when the forward and aft film gates are positioned together. The approaches along the relief channel 97 to the gate glass 99 can be designed to form ramps leading to the edges of the gate glass, so that film which has bowed outwardly of its normal travel path will be protected from being scratched.

Figure 2:
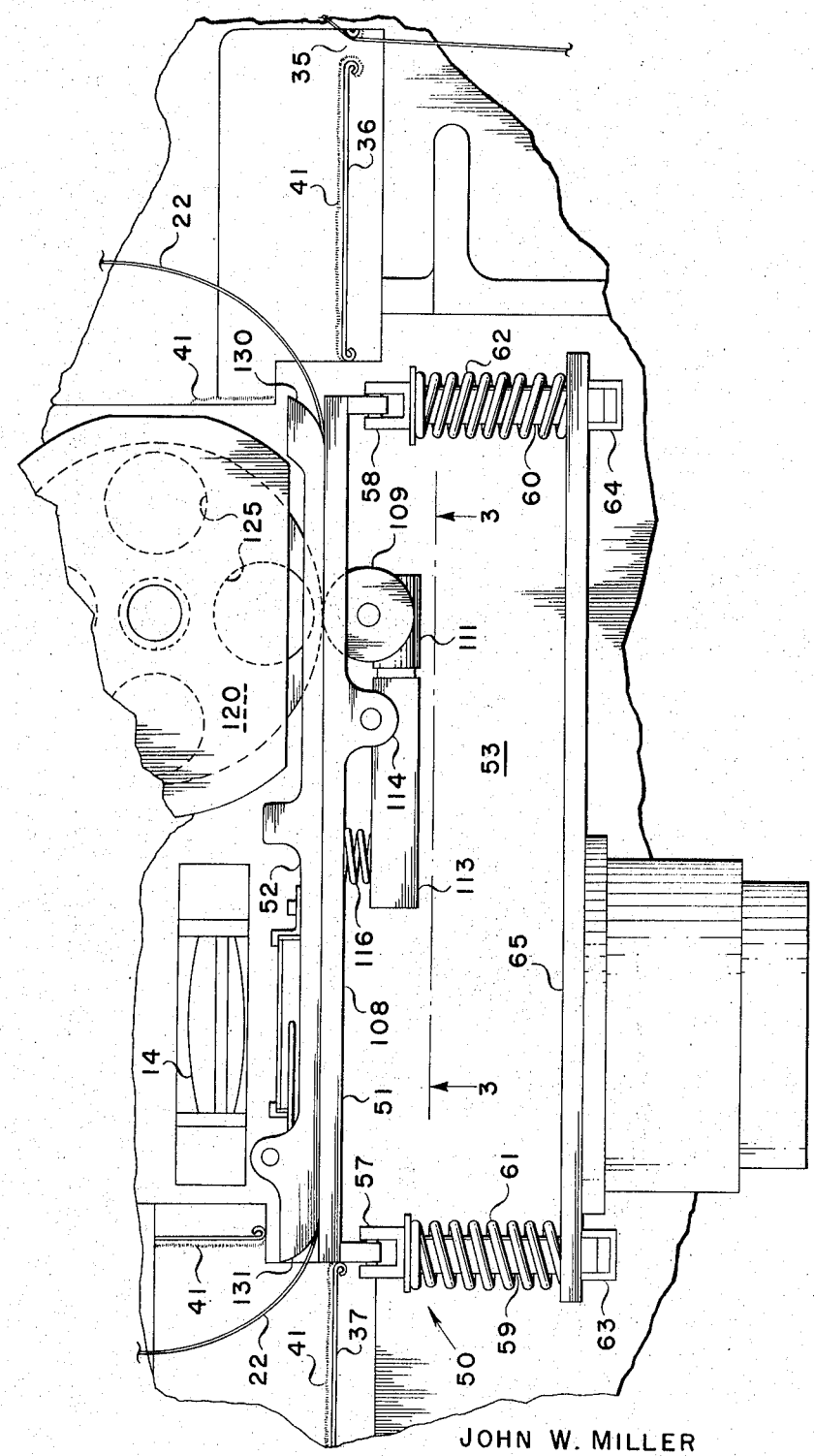
FIG. 2 shows in plan view the film gate assembly of the embodiment of FIG. 1.
Figure 3:
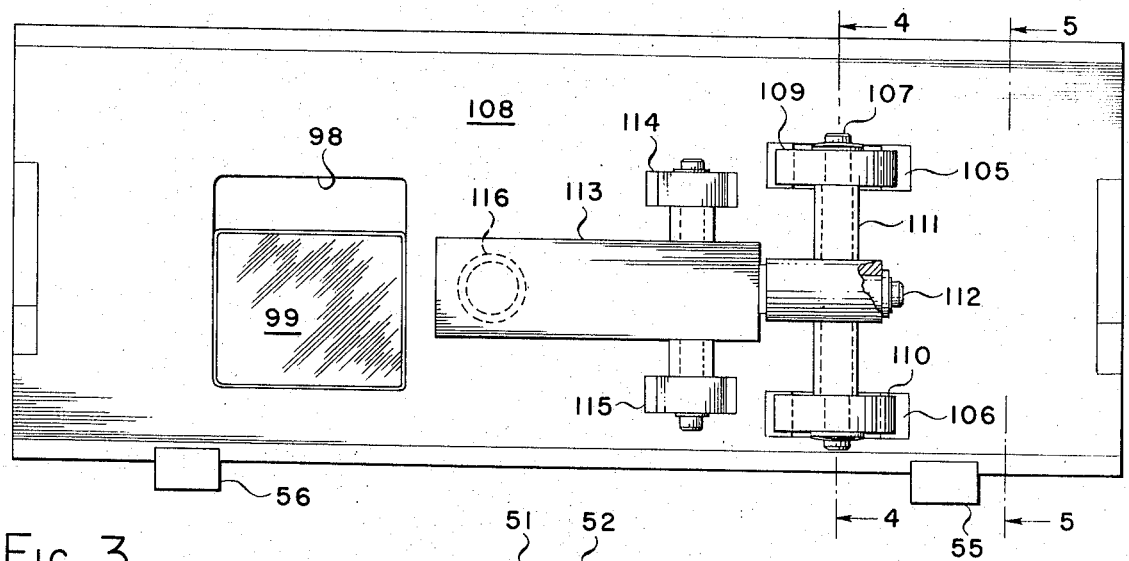
FIG. 3 shows a section view taken along line 3—3 of FIG. 2 and showing details of the idler wheel assembly.
Figure 4:
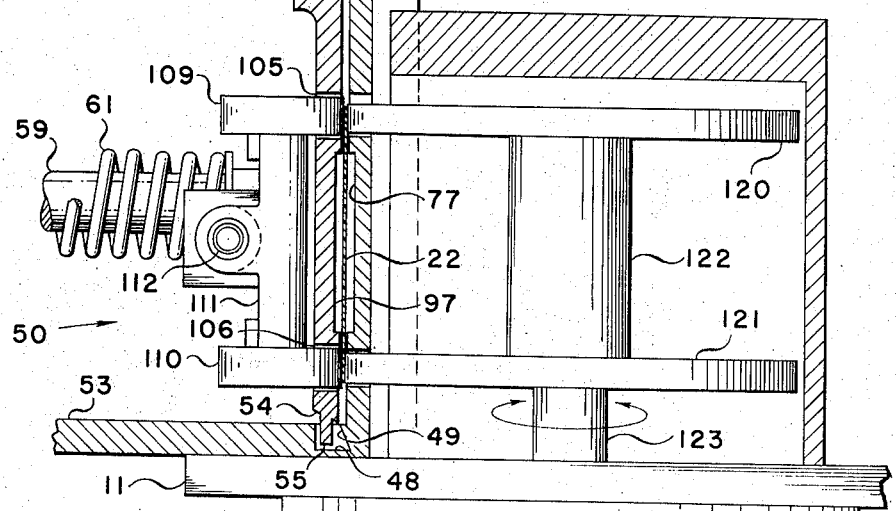
FIG. 4 shows a section view taken along line 4—4 of FIG. 3 and showing engagement of the idler wheels and the drive wheels with film passing through the film gate assembly.

Two apertures 105 and 106 extend through the forward film gate 51. Journalled for rotation on a shaft 107 contained on the outer side 108 of the forward film gate are a first idler wheel 109 and a second idler wheel 110, which are dimensioned to extend through the respective apertures 105 and 106 so that the periphery of each idler wheel is in the film channel 76. The shaft 107 is contained within a housing 111 which is journalled for rotation on a second shaft 112 projecting from support 113. The support 113 is pivotally attached to the tabs 114, 115 projecting upwardly from the outer side 108 of the forward film gate. A compression spring 116 biases the support member 113 to keep the idler wheels 109 and 110 pressed inwardly of the apertures 105 and 106. When the forward and aft film gates are together as shown in FIGS. 2 and 4, the film 22 in the film channel 76 is pinched against a first film edge between the idler wheel 109 and a first drive wheel 120 and is pinched against the other film edge between the idler wheel 110 and a second drive wheel 121. The drive wheels 120 and 121, each of which may have holes 125 symmetrically contained therein to reduce the rotational inertia of the wheels, are connected to a hub 122 which is mounted on shaft 123 for rotation by the bi-directional drive motor 124. The pivotal mounting of the housing 111 insures that each of the idler wheels will bear with equal force on the film pinched against the respective drive wheels.

Figure 5:
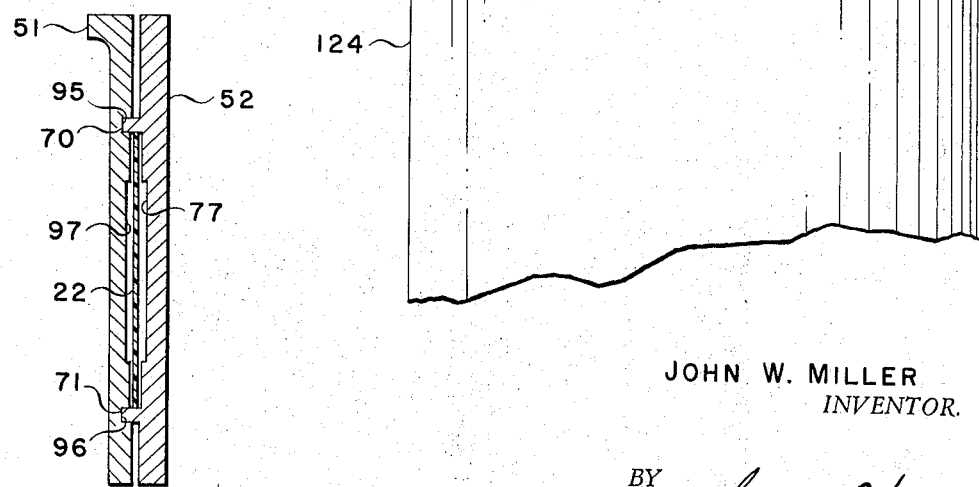
FIG. 5 shows a section view taken along line 5—5 of FIG. 3 and showing details of the film gate assembly.

In describing the operation of the disclosed embodiment, assume that a reel 39 of film to be loaded into the empty cassette 21 has been positioned on the spindle 38. The forward gate 51 is withdrawn from the aft gate 52 by means of the camming levers 63 and 64 and the leader end of the film on the reel 39 is manually inserted through the slot 35 and is placed along the film channel 76. The forward gate is then closed to contact the aft gate so that the film is sandwiched in the film channel as shown in FIGS. 4 and 5. The relief channels 77 and 97 eliminate or minimize contact of the film with the walls of the film channel, thereby eliminating or reducing the likelihood of scratching the film; the film is pinched adjacent its edges, preferably along a film location which does not contain any usable information, between the idler wheels 109, 110, and the drive wheels 120, 121. Both the idler wheels and the drive wheels can be made of steel or other suitable hard material, although quieter operation of the drive mechanism results from the use of idler wheels having at least a periphery of a suitable resilient material such as silicone rubber or the like.

Alternatively, an end of the film can be inserted into an end of the film gate for engagement between the idler wheels and the drive wheels.

When the drive motor 124 is actuated by suitable circuitry forming no part of the present invention, the film is moved through the film gate to exit at the left side thereof as viewed in FIGS. 1 and 2 and to slide on its edges into the film cassette 21. This film movement continues as the film unwinds from the reel 39 and the film exiting the gate forms the loops 38 by the natural tendency of photographic film standing on edge in a confined area to fold into loops. When all of the film has been unreeled from the reel 39, the drive motor 134 is stopped either mechanically or by means of appropriate control signals encoded on the film. A trailer of unused film may remain connected to the reel 39 at all times. When the drive motor 124 is reversed to drive the film to exit the right side of the film gate as seen in FIGS. 1 and 2, film will be withdrawn from the loops in the left side of the film cassette to pass through the gate and form loops of film in the right side of the cassette. The ends of the aft film gate 52 are curved as shown at 130 and 131 to guide the entry of the film into the gate during high speed transport of the film. A loop 22a is provided in the free end of the film to prevent this end from inadvertently entering the film gate during normal operation of the apparatus. Alternatively to leaving the film trailer on the reel 39, the film may be completely contained within the cassette either as a continuous loop or as having both ends looped. In any event, movement of the film through the gate causes the loops 28 to migrate through the cassette so that substantially the entire cassette volume is used to store the film 22.

The film transport functions of film acceleration, high-speed transport, braking, and low-speed transport for accurate positioning of the film are all accomplished by appropriate actuation of the drive motor 124, which may be a direct-current torque motor. Since the film is stored loosely in the loops 28, rapid acceleration of the film in the gate from standstill is not hampered by the inertia of film stored on a reel, and deceleration of the film moving through the gate is similarly not hampered by the need to brake rapidly-spinning film reels. The only inertia associated with the present film tranport system is that of the drive wheels, the idler wheels and, of course, the armature or rotor of the drive motor itself. The idler wheels are maintained against the film 22 by means of the spring 116 and the swivel connection of the housing 111 on the shaft 112, so that any variation in film thickness such as a film splice, or minor eccentricity of the drive wheels 120 or 121 does not adversely affect the pinching contact between the drive wheels and the respective idler wheels. Since both the drive motor and the solenoid 86 are inoperative when the film has been positioned for viewing a particular frame, image-bothering bothering vibration is avoided.

Removal of the film from the cassette is accomplished by opening the film gate assembly to free the film from being pinched between the idler wheels 109, 110 and the drive wheels 120, 121, and by then operating the crank 40 to rewind the film from the cassette onto the reel 39. It will be understood, of course, that the film 22 could be preloaded in the cassette to be completely contained therein, except for the length of film which extends across the open end of the U-shaped open area 26, and that changing the film could be accomplished by removing the entire cassette and substituting another preloaded cassette since the opened film gate assembly permits the film therein to be vertically withdrawn from the gate.

Although such terms as "forward film gate" and "aft film gate" are used to describe the disclosed embodiment of the present invention because of the relative positions of such components within the embodiment, no limitation is intended from the use of such terms.

The surfaces along which the film is moved, including the surfaces of the film channel 76, preferably should be smooth and hard, so as to reduce scratching of the film and also so as to minimize the chance that the surface itself will become scratched by a foreign particle which becomes lodged therein. Chrome plating the appropriate surfaces has been found to yield satisfactory results.

It should be understood, of course, that the foregoing relates only to a preferred embodiment of the invention and that numerous modifications or alterations may be made therein without departing from the spirit and scope of the invention as set forth in the appended claims.

What is claimed is:

1. Apparatus for transporting and positioning a photographic film, comprising in combination:
    film gate means including a pair of film gate members and defining a film channel along which a length of film may be traversed,
        the first film gate member having a first facing surface bounded along the sides thereof by a pair of spaced apart film edge abutment means extending outwardly of said first surface and defining the film width of said film channel,
        the second film gate member having a second facing surface bounded along the sides thereof by a pair of recess means each of which is configured to receive a corresponding one of said abutment means;
    said film channel being further defined by said first and second facing surfaces extending between said pairs of abutment means and recess means;
    said first and second facing surfaces being spaced apart along the film channel at locations proximate each of said abutment and recess means by an extent which freely permits sliding traverse of the film therealong while defining the path of film traverse by sliding contact between said facing surface locations and the film areas disposed facing said locations;
    said first and second facing surfaces further being spaced apart along the film channel and intermediate said proximate locations by an extent which is greater than the spacing between said surfaces at said proximate locations to provide a relief channel which at least minimizes sliding contact between said facing surfaces along said relief channel and film disposed therebetween; and film gate assembly means supporting said first and second film gate members in relatively movable relationship with each other, said film gate assembly means being selectively operative to move said gate members to a closed position wherein said gate members engage each other to dispose each of said abutment means into said corresponding recess means to define said film channel, and to move said gate means to an open position wherein said gate members are disengaged from each other to open said film channel.

2. Apparatus as in claim 1, further comprising:
    at least one aperture extending through said first film gate to interrupt said first facing surface;
    at least one aperture extending through said second film gate to interrupt said second facing surface;
    said apertures being positioned on said respective film gates to cause the apertures to be in juxtaposition with each other when said film gates are in the closed position;
    drive wheel means mounted to extend peripherally through one of said apertures to be present in said film channel to contact the surface of a film positioned therein;
    motive means connected to selectively cause said drive wheel means to rotate in either direction; and
    idler wheel means mounted to extend peripherally through the other of said apertures to be present in said film channel so that a film positioned therein is pinched between said drive wheel means and said idler wheel means.

3. Apparatus as in claim 2, wherein:
    said first film gate has a pair of said apertures extending therethrough and disposed symmetrically of the path of film traverse so that each of said pair of apertures interrupts said first smooth surface at a respective one of said locations proximate said abutment means;
    said drive wheel means includes a first drive wheel extending peripherally through one of said pair of apertures and a second drive wheel extending peripherally through the other of said pair of apertures, both of said drive wheels connected to said motive means;

said second film gate has a pair of said apertures extending therethrough and positioned to be disposed in juxtaposition with said pair of apertures on said first film gate when said film gates are in the closed position; and said idler wheel means includes a pair of idler wheels mounted to extend individually through each of said pair of apertures in said second film gate.

4. Apparatus as in claim 3, wherein:

said idler wheels are resiliently biased to extend inwardly of said pair of apertures in said second film gate.

5. Apparatus as in claim 2, further comprising:

a first projection aperture extending through said first film gate to interrupt said first facing surface;

a second projection aperture extending through said second film gate to interrupt said second facing surface;

said first and second projection apertures being positioned on said respective film gates to be in juxtaposition with each other when said film gates are in the closed position;

a first transparent member disposed to occupy said first projection aperture;

a second transparent member disposed to occupy said second projection aperture;

one of said transparent members being fixedly positioned in the respective projection aperture to present to said film channel a first gate surface which is substantially a continuation of the film gate surface;

the other of said transparent members being movably positioned in the other projection aperture to assume a first position wherein said other transparent member presents to said film channel a second gate surface which is substantially a continuation of the film gate surface, so that a portion of the film in the film channel is pressed between said first and second gate surfaces, and to assume a second position wherein said other transparent member is withdrawn from the other projection aperture at least sufficiently to release the film between said first and second gate surfaces; and means operatively connected to said other transparent member to selectively move that member to either of said first and second positions.

6. Apparatus as in claim 5, wherein:

said means operatively connected to said other transparent member comprises a pair of spring members respectively operatively connected between opposite sides of said other transparent member and an actuating member;

each of said spring members being operatively connected to the respective side of said other transparent member so as to permit relative movement therebetween; and means operatively connected to said actuating member to move the actuating member to a first position, whereat said spring members move said other transparent member into conforming pressing contact with said film portion, and to a second position whereat said other transparent member is withdrawn from said other projection aperture as aforesaid.

7. Apparatus for storing and positioning a web, comprising:

storage cassette means having a top member and a bottom member generally parallel with each other and spaced apart from each other a distance slightly greater than the width of the web to define a region for receiving a length of web standing on edge and disposed in random formation within said region;

said cassette means having an interrupted region along which a portion of the web stored in the cassette means can extend to pass from a first opening in the cassette means across the interrupted region and re-enter the cassette means at a second opening therein for random formation retention therein;

web gate means positioned to receive and guide the movement of the web portion passing in either direction across the interrupted region;

said web gate means including guide means defining a web channel having a first portion having a depth adjacent each edge of the web to closely confine and guide the web in sliding movement therealong and a second portion having a depth greater than the depth of said first portion to at least minimize sliding contact between the web and said second portion; and web drive means positioned to contact said web portion for selectively moving the web in a first direction through said web gate means to be withdrawn from said first opening to re-enter said second opening, and in a second direction through said web gate means to be withdrawn from said second opening and to re-enter said first opening;

said web drive means comprising at least one drive wheel means positioned to contact one side of the web portion in said web channel;

at least one idler wheel means positioned to contact the other side of the web portion so that the web is pinched between the drive wheel means and the idler wheel means;

said web drive means further comprising motive means connected to selectively cause said drive wheel means to rotate in a first direction to move the web in the first direction through said web chennel and in a second direction to move the web in the second direction through the web channel.

8. Apparatus as in claim 7, wherein:

said drive wheel means comprises a pair of drive wheels positioned to make respective contact with each edge of the web; and said idler wheel means comprises a pair of idler wheels positioned to contact the other side of the web respectively opposite each of said drive wheels; and said drive wheels are connected to be selectively rotated by said motive means.

9. Apparatus as in claim 8, wherein:

said idler wheels are resiliently biased into contact with the other side of the web.

* * * * *